US009006306B2

(12) United States Patent
La Camera et al.

(10) Patent No.: US 9,006,306 B2
(45) Date of Patent: Apr. 14, 2015

(54) FLAME RETARDANT POLYMER COMPOSITIONS

(71) Applicant: SABIC Innovative Plastics IP B.V., Bergen op Zoom (NL)

(72) Inventors: Domenico La Camera, Breda (NL); Hendrik Kormelink, Heveerlee (BE); Jelena Božović-Vukić, Eindhoven (NL); Yohana Pérez, St. Cyr LÉcole (FR)

(73) Assignee: SABIC Global Technologies B.V., Bergen op Zoom (NL)

(*) Notice: Subject to any disclaimer, the term of this patent is extended or adjusted under 35 U.S.C. 154(b) by 0 days.

(21) Appl. No.: 13/902,086

(22) Filed: May 24, 2013

(65) Prior Publication Data

US 2013/0331478 A1 Dec. 12, 2013

Related U.S. Application Data

(60) Provisional application No. 61/651,350, filed on May 24, 2012.

(51) Int. Cl.

| | |
|---|---|
| *C08G 18/67* | (2006.01) |
| *B01F 3/04* | (2006.01) |
| *C08F 2/46* | (2006.01) |
| *C08G 61/04* | (2006.01) |
| *C08K 5/5313* | (2006.01) |
| *C08K 5/00* | (2006.01) |
| *C08L 67/00* | (2006.01) |
| *C08L 77/00* | (2006.01) |

(52) U.S. Cl.
CPC ............. *C08K 5/5313* (2013.01); *C08K 5/0025* (2013.01); *C08L 67/00* (2013.01); *C08L 77/00* (2013.01)

(58) Field of Classification Search
CPC .... C08K 5/0025; C08K 5/5313; C08L 77/00; C08L 67/00
USPC ................................. 522/174, 173, 1; 520/1
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,465,319 A | 3/1949 | Rex et al. | |
| 2,512,606 A | 6/1950 | Kirk et al. | |
| 2,534,252 A | 12/1950 | Max | |
| 2,682,522 A | 6/1954 | Harry et al. | |
| 2,716,101 A | 8/1955 | Harry et al. | |
| 2,891,915 A | 6/1959 | William et al. | |
| 3,047,539 A | 7/1962 | Pengilly | |
| 3,326,852 A | 6/1967 | Thomas | |
| 3,442,854 A | 5/1969 | Ludwig et al. | |
| 3,814,869 A | 6/1974 | De Luca | |
| 3,847,867 A | 11/1974 | Heath | |
| 3,850,558 A | 11/1974 | Payraudeau | |
| 3,850,885 A | 11/1974 | Kochanowski et al. | |
| 3,852,242 A | 12/1974 | White | |
| 3,855,178 A | 12/1974 | White et al. | |
| 3,884,882 A | 5/1975 | Caywood, Jr. | |
| 3,919,363 A | 11/1975 | Ura et al. | |
| 3,946,093 A | 3/1976 | Koto et al. | |
| 3,983,093 A | 9/1976 | Williams, III et al. | |
| 4,046,724 A | 9/1977 | Kato et al. | |
| 4,147,740 A | 4/1979 | Swiger et al. | |
| 4,154,775 A | 5/1979 | Axelrod | |
| 4,174,358 A | 11/1979 | Epstein | |
| 4,251,644 A | 2/1981 | Joffrion | |
| 4,328,174 A | 5/1982 | Schmidt et al. | |
| 4,331,614 A | 5/1982 | Schmidt et al. | |
| 4,346,194 A | 8/1982 | Roura | |
| 4,374,971 A | 2/1983 | Schmidt et al. | |
| 4,374,974 A | 2/1983 | Hay | |
| 4,415,719 A | 11/1983 | Schmidt et al. | |
| 4,474,927 A | 10/1984 | Novak | |
| 5,216,113 A | 6/1993 | Schulz-Schlitte et al. | |
| 5,334,692 A | 8/1994 | Hess et al. | |

(Continued)

FOREIGN PATENT DOCUMENTS

| | | |
|---|---|---|
| GB | 2043083 | 10/1980 |
| JP | 59/12936 | 1/1984 |

(Continued)

OTHER PUBLICATIONS

Rakotomalala et al, Recent Developments in Halogen Free Flame Retardants for Epoxy Resins for Electrical and Electronic Applications, Aug. 11, 2010, Materials, 3, 4300-4327.*

Braun et al., "Flame Retardancy Mechanisms of Aluminium Phosphinate in Combination with Melamine Cyanurate in Glass-Fibre Reinforced Poly(1,4-butylene terephthalate)", Macromolecular Materials Eng., 2008, 293, 206-217.

Damm et al., "Chapter 11: Colorants" in Plastics Additives Handbook, 4th Edition. R. Gachter and H. Muller (eds.), P. P. Klemchuck (assoc. ed.) Hansen Publishers, New York 1993, 74 pages.

Feng et al., "Radiation Crosslinking of Polyamide 610", Radiation Physics and Chemistry, 2002, 63(3-6), 493-496.

(Continued)

*Primary Examiner* — Ling Choi
*Assistant Examiner* — Jessica E Whiteley
(74) *Attorney, Agent, or Firm* — Baker & Hostetler LLP

(57) ABSTRACT

In one aspect, the invention relates to crosslinkable, flame retardant polymer compositions are provided comprising a polyamide or polyester; a flame retardant system; a crosslinking agent; and a flame retardant system coagent. This abstract is intended as a scanning tool for purposes of searching in the particular art and is not intended to be limiting of the present invention.

34 Claims, No Drawings

(56) References Cited

U.S. PATENT DOCUMENTS

| | | |
|---|---|---|
| 5,780,534 A | 7/1998 | Kleiner et al. |
| 6,013,707 A | 1/2000 | Kleiner et al. |
| 6,288,210 B1 | 9/2001 | Shobha et al. |
| 6,291,630 B1 | 9/2001 | Konig et al. |
| 6,365,071 B1 * | 4/2002 | Jenewein et al. ............. 252/609 |
| 6,407,200 B1 | 6/2002 | Singh et al. |
| 6,437,084 B1 | 8/2002 | Birsak et al. |
| 6,861,499 B2 | 3/2005 | Vinciguerra et al. |
| 7,423,080 B2 * | 9/2008 | Cartier et al. ................. 524/126 |
| 7,560,525 B2 | 7/2009 | Freitag et al. |
| 7,816,486 B2 | 10/2010 | Freitag et al. |
| 7,838,604 B2 | 11/2010 | Freitag |
| 7,888,534 B2 | 2/2011 | Freitag et al. |
| 7,928,259 B2 | 4/2011 | Freitag et al. |
| 2005/0020800 A1 | 1/2005 | Levchik et al. |
| 2005/0143503 A1 * | 6/2005 | Bauer et al. ................... 524/115 |
| 2007/0219295 A1 | 9/2007 | Levchik et al. |
| 2008/0045673 A1 | 2/2008 | Piotrowski et al. |
| 2009/0045544 A1 | 2/2009 | Silvi et al. |

FOREIGN PATENT DOCUMENTS

| | | |
|---|---|---|
| JP | 02196856 | 8/1990 |
| JP | 2003/327726 | 11/2003 |

OTHER PUBLICATIONS

Gallucci et al., "Preparation and Reactions of Epoxy-Modified Polyethylene", Journal of Applied Polymer Science, 1982, 27(2), 425-437.

Levchik et al., "Combustion and Flame Retardancy of Aliphatic Nylons", Polymer Int., 2000, 49, 1033-1073.

Rakotomalala et al., "Recent Developments in Halogen Free Flame Retardants for Epoxy Resins for Electrical and Electronic Applications", Materials, 2010, 3(8), 4300-4327.

* cited by examiner

US 9,006,306 B2

FLAME RETARDANT POLYMER COMPOSITIONS

CROSS-REFERENCE TO RELATED APPLICATIONS

This application claims the benefit of U.S. Provisional Application No. 61/651,350, filed May 24, 2012, which is incorporated herein by reference in its entirety.

BACKGROUND

Crosslinked polyamide compositions are known in the art (See, W. Feng et al., "Radiation Physics and Chemistry", 63, pp. 493-496 (2002)). Japanese published application 59-012936A2 describes a crosslinked polyamide resin obtained by exposing a polyamide resin containing a crosslinker to a radiation beam. The resin can be free of glass fiber, and a flame retardant or filler can be incorporated into the resin.

Japanese published application 02-196856A2 describes a crosslinking flame-resistant polyamide composition prepared by compounding a polyamide with a brominated, crosslinkable styrenic resin and a multifunctional monomer and, if necessary, a flame resistance auxiliary. The multifunctional monomer can be triallyl cyanurate or triallyl isocyanurate. The polyamide resin composition is crosslinked with an ionizing radiation.

Japanese published application 2003-327726A2 describes a resin composition comprising a polyamide resin, a multifunctional monomer, a bromine-based flame retardant, an antimony-based flame retardant auxiliary, and hydrotalcite. The crosslinked polyamide resin molding is formed by irradiation crosslinking with an ionizing radiation.

Crosslinked polyamide materials can be used as a cost-effective replacement for thermosets or high temperature resistant polymers. The materials can be used for articles and parts for electronics and electrical applications where good short-term heat resistance is needed and are which are not met by regular flame retardant polyamide compositions. Exemplary applications include contact holders in electrical contactors and lead free soldering connectors. These applications often require the composition to possess properties such as high short-term heat resistance, good flame retardant properties, good mechanical properties, and good arc tracking resistance. Although there are known crosslinked polyamide materials, none have been able to meet all of the stringent requirements needed for electronic applications.

Moreover, flame retardants can differ widely in their flow properties and thus, can influence the formulation flow properties. The type of flame retardants used can also impact the electrical properties of a polymer formulation. Polymer formulations with higher comparative tracking index (CTI) values permits thinner wall thickness, but thinner wall applications necessitate superior flow properties during compounding.

Accordingly, there remains a need in the art for halogen-free flame retardant crosslinked polymer compositions that exhibit good flame retardant properties, good electrical performance such as arc tracking resistance, while at the same time retaining good mechanical properties. Accordingly, these needs, and others are met by the present invention.

SUMMARY OF THE INVENTION

In various aspects, one or more of the described drawbacks and disadvantages described above may be alleviated by a flame retardant polymer composition comprising a polyamide or polyester; a crosslinking agent; a flame retardant system comprising a metal phosphinate salt, a metal diphosphinate salt, or combination thereof; and a flame retardant system coagent.

In one aspect, the invention relates to flame retardant compositions comprising a polyamide or polyester; a crosslinking agent, a flame retardant system comprising a metal phosphinate salt, a metal diphosphinate salt, or combination thereof; and a flame retardant system coagent; wherein the crosslinking agent comprises two or more groups capable of forming free radicals under beta or gamma radiation.

In a further aspect, the invention relates to flame retardant compositions comprising a polyamide or polyester; from about 1 to about 20 wt % of a polyallylic compound or a polyol poly(meth)acrylate crosslinking agent; from about 0 to about 60 wt % of glass fiber; from about 5 to about 50 wt % of a flame retardant system comprising i) a metal phosphinate salt, a metal diphosphinate salt, or a combination thereof; and optionally ii) at least one nitrogen compound selected from the group consisting of condensation products of melamine and/or reaction products of condensation products of melamine with phosphoric acid, and/or mixtures thereof, melam, melem, melon, melamine cyanurate, melamine phosphate compounds, dimelamine phosphate, melamine pyrophosphate, benzoguanamine compounds, terepthalic ester compounds of tris(hydroxyethyl)isocyanurate, allantoin compounds, glycoluril compounds, ammeline, ammelide, and combinations thereof; and from about 1 to about 50 wt % of a flame retardant system coagent; wherein all the amounts are based upon the total weight of the composition.

In a further aspect, described herein are methods of forming a crosslinkable, flame retardant composition comprising blending a polyamide or polyester, a crosslinking agent; a flame retardant system comprising i) a metal phosphinate salt, a metal diphosphinate salt, or combination thereof; and optionally ii) at least one nitrogen compound selected from the group consisting of condensation products of melamine and/or reaction products of condensation products of melamine with phosphoric acid, and/or mixtures thereof, melam, melem, melon, melamine, melamine cyanurate, melamine phosphate compounds, dimelamine phosphate, melamine pyrophosphate, melamine polyphosphate compounds, benzoguanamine compounds, terephthalic ester compounds of tris(hydroxyethyl)isocyanurate, allantoin compounds, glycoluril compounds, ammeline, ammelide, and combinations thereof; and a flame retardant system coagent, to form an intimate blend.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate poly" includes mixtures of two or more polycarbonate polymers, i.e. The terms "a" and "an" herein do not denote a limitation of quantity, but rather denote the presence of at least one of the referenced item.

As used herein, the term "combination" is inclusive of blends, mixtures, alloys, reaction products, and the like.

Ranges can be expressed herein as from one particular value, and/or to another particular value. All ranges disclosed herein are inclusive and combinable. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally substituted alkyl" means that the alkyl group can or cannot be substituted and that the description includes both substituted and unsubstituted alkyl groups.

As used herein, the term "effective amount" refers to an amount that is sufficient to achieve the desired modification of a physical property of the composition or material. For example, an "effective amount" of flame retardant filler refers to an amount that is sufficient to achieve the desired improvement in the property modulated by the formulation component, e.g. achieving the desired level of flame retardancy. The specific level in terms of wt % in a composition required as an effective amount will depend upon a variety of factors including the amount and type of polyamide, amount and type of laser direct structure additive, amount and type of thermally conductive filler, and end use of the article made using the composition.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. Thus, if a class of fillers A, B, and C are disclosed as well as a class of additives D, E, and F and an example of a combination A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, compositions, and steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Compounds are described using standard nomenclature. For example, any position not substituted by any indicated group is understood to have its valence filled by a bond as indicated, or a hydrogen atom. A dash ("—") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n propyl, isopropyl, n butyl, isobutyl, t butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-dihydroxyphenyl radical in a particular compound has the structure:

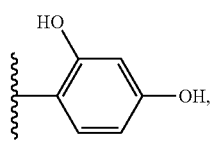 [SMILES: *c1ccc(O)cc1O]

regardless of whether 2,4-dihydroxyphenyl is used to prepare the compound. In some aspects the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

"Organic radicals," as the term is defined and used herein, contain one or more carbon atoms. An organic radical can have, for example, 1-26 carbon atoms, 1-18 carbon atoms, 1-12 carbon atoms, 1-8 carbon atoms, 1-6 carbon atoms, or 1-4 carbon atoms. In a further aspect, an organic radical can have 2-26 carbon atoms, 2-18 carbon atoms, 2-12 carbon atoms, 2-8 carbon atoms, 2-6 carbon atoms, or 2-4 carbon atoms. Organic radicals often have hydrogen bound to at least some of the carbon atoms of the organic radical. One example, of an organic radical that comprises no inorganic atoms is a 5,6,7,8-tetrahydro-2-naphthyl radical. In some aspects, an organic radical can contain 1-10 inorganic heteroatoms bound thereto or therein, including halogens, oxygen, sulfur, nitrogen, phosphorus, and the like. Examples of organic radicals include but are not limited to an alkyl, substituted alkyl, cycloalkyl, substituted cycloalkyl, mono-substituted amino, di-substituted amino, acyloxy, cyano, carboxy, carboalkoxy, alkylcarboxamide, substituted alkylcarboxamide, dialkylcarboxamide, substituted dialkylcarboxamide, alkylsulfonyl, alkylsulfinyl, thioalkyl, thiohaloalkyl, alkoxy, substituted alkoxy, haloalkyl, haloalkoxy, aryl, substituted aryl, heteroaryl, heterocyclic, or substituted heterocyclic radicals, wherein the terms are defined elsewhere herein. A few non-limiting examples of organic radicals that include heteroatoms include alkoxy radicals, trifluoromethoxy radicals, acetoxy radicals, dimethylamino radicals and the like.

The terms "residues" and "structural units", used in reference to the constituents of the polymers, are synonymous throughout the specification.

As used herein, the terms "number average molecular weight" or "$M_n$" can be used interchangeably, and refer to the statistical average molecular weight of all the polymer chains in the sample and is defined by the formula:

$$M_n = \frac{\sum N_i M_i}{\sum N_i},$$

where $M_1$ is the molecular weight of a chain and $N_1$ is the number of chains of that molecular weight. $M_n$ can be determined for polymers, e.g., polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "Mw" can be used interchangeably, and are defined by the formula:

$$M_w = \frac{\sum N_i M_i^2}{\sum N_i M_i},$$

where $M_1$ is the molecular weight of a chain and $N_1$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

As used herein, the terms "polydispersity index" or "PDI" can be used interchangeably, and are defined by the formula:

$$PDI = \frac{M_w}{M_n}.$$

The PDI has a value equal to or greater than 1, but as the polymer chains approach uniform chain length, the PDI approaches unity.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

As described herein, crosslinkable polyamide or polyester compositions comprising a halogen-free flame retardant system based on a phosphinate metal salt and/or a diphosphinate metal salt, optionally in combination with a nitrogen compound; and a flame retardant system co-agent show excellent radiation crosslinking in the presence of a crosslinking agent to provide crosslinked polymer compositions. The crosslinkable polyamides exhibit excellent flame retardant, physical, and electrical properties suitable for a wide range of applications. Exemplary uses for the crosslinked compositions include forming durable articles, structured products, and electrical and electronics components. One advantage realized by these crosslinked compositions is their ability to withstand short term, high thermal loading while maintaining excellent flame retardant and mechanical properties.

The crosslinkable polyamide or polyester compositions can be crosslinked by an ionizing radiation such as beta or gamma radiation.

The non-halogenated polyamide compositions provided herein exhibit good flame retardant properties as evidenced by UL 94, Glow Wire Flammability Index, and Glow Wire Ignition Temperature results; as well as good electrical performance as evidenced by comparative tracking index results. These results render the compositions suitable for electrical appliances and electronics components, as well as appliance and transportation applications.

The polyamide resins include a generic family of resins known as nylons, characterized by the presence of an amide group (—C(O)NH—). Nylon-6 and nylon-6,6 are suitable polyamide resins available from a variety of commercial sources. Other polyamides, however, such as nylon-4, nylon-4,6, nylon-12, nylon-6,10, nylon-6,9, nylon-6,12, nylon-9T, copolymer of nylon-6,6 and nylon-6, and others such as the amorphous nylons, may also be useful. Mixtures of various polyamides, as well as various polyamide copolymers, can be used.

The polyamides can be obtained by a number of well-known processes such as those described in U.S. Pat. Nos. 2,071,250; 2,071,251; 2,130,523; 2,130,948; 2,241,322; 2,312,966; and 2,512,606. Nylon-6, for example, is a polymerization product of caprolactam. Nylon-6,6 is a condensation product of adipic acid and 1,6-diaminohexane. Likewise, nylon 4,6 is a condensation product between adipic acid and 1,4-diaminobutane. Besides adipic acid, other useful diacids for the preparation of nylons include azelaic acid, sebacic acid, dodecane diacid, as well as terephthalic and isophthalic acids, and the like. Other useful diamines include m-xylene diamine, di-(4-aminophenyl)methane, di-(4-aminocyclohexyl)methane; 2,2-di-(4-aminophenyl)propane, 2,2-di-(4-aminocyclohexyl)propane, among others. Copolymers of caprolactam with diacids and diamines are also useful.

It is also to be understood that the use of the term "polyamides" herein is intended to include the toughened or super tough polyamides. Super tough polyamides, or super tough nylons, as they are more commonly known, such as those available commercially, e.g. from E.I. duPont under the trade name ZYTEL ST, or those prepared in accordance with U.S. Pat. No. 4,174,358 to Epstein; U.S. Pat. No. 4,474,927 to Novak; U.S. Pat. No. 4,346,194 to Roura; and U.S. Pat. No. 4,251,644 to Jeffrion, among others and combinations comprising at least one of the foregoing, can be employed.

Generally, these super tough nylons are prepared by blending one or more polyamides with one or more polymeric or copolymeric elastomeric toughening agents. Suitable toughening agents are disclosed in the above-identified U.S. patents as well as in U.S. Pat. No. 3,884,882 to Caywood, Jr., U.S. Pat. No. 4,147,740 to Swiger et al.; and "Preparation and Reactions of Epoxy-Modified Polyethylene", J. Appl. Poly. Sci., V 27, pp. 425-437 (1982). Typically, these elastomeric polymers and copolymers may be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

The amount of polyamide present in the composition may be about 20 to about 96 wt %, more specifically about 40 to about 80 wt %, even more specifically about 50 to about 75 wt %, or yet more specifically about 60 to about 70 wt % based on the total weight of the composition.

Suitable polyesters include crystalline polyesters such as polyesters derived from an aliphatic or cycloaliphatic diols, or mixtures thereof, containing from 2 to about 10 carbon atoms and at least one aromatic dicarboxylic acid. Specific polyesters are derived from an aliphatic diol and an aromatic dicarboxylic acid having repeating units of the following general formula:

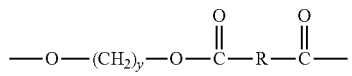

wherein y is an integer of from 2 to 6. R is a $C_6$-$C_{20}$ aryl radical comprising a decarboxylated residue derived from an aromatic dicarboxylic acid.

Examples of aromatic dicarboxcylic acids represented by the decarboxylated residue R are isophthalic or terephthalic acid, 1,2-di(p-carboxyphenyl)ethane, 4,4'-dicarboxydiphenyl ether, 4,4'-bisbenzoic acid and mixtures thereof. All of these acids contain at least one aromatic nucleus. Acids containing fused rings can also be present, such as in 1,4-, 1,5-, or 2,6-naphthalenedicarboxylic acids. Exemplary dicarboxcylic acids are terephthalic acid, isophthalic acid, naphthalene dicarboxcylic acid or mixtures thereof.

Exemplary polyesters are poly(ethylene terephthalate) ("PET"), and poly(1,4-butylene terephthalate), ("PBT"), poly(ethylene naphthanoate) ("PEN"), poly(butylene naphthanoate), ("PBN") and poly(propylene terephthalate) ("PPT").

Also contemplated herein are the above polyesters with minor amounts, e.g., from about 0.5 to about 5 percent by weight, of units derived from aliphatic acid and/or aliphatic polyols to form copolyesters. The aliphatic polyols include glycols, such as poly(ethylene glycol). Such polyesters can be made following the teachings of, for example, U.S. Pat. Nos. 2,465,319 and 3,047,539.

An exemplary poly(1,4-butylene terephthalate) resin that can be used herein is one obtained by polymerizing a glycol component of at least 70 mol %, specifically at least 80 mol %, of which consists of tetramethylene glycol and an acid component at least 70 mol %, specifically at least 80 mol %, of which consists of terephthalic acid, or polyester-forming derivatives therefore.

The polyesters used herein have an intrinsic viscosity of from about 0.4 to about 2.0 dl/gas measured in a 60:40 phenol/tetrachloroethane mixture or similar solvent at 23°-30° C. VALOX® 315 polyester available from GE Plastics is suitable having an intrinsic viscosity of 1.1 to 1.4 dl/g.

Blends of polyesters may also be employed in the composition. A blended polyester can include the combination of poly(ethylene terephthalate) and poly(1,4-butylene terephthalate). When blends of these components are employed the polyester resin component can comprise from about 1 to about 99 parts by weight poly(ethylene terephthalate) and from about 99 to about 1 part by weight poly(1,4-butylene terephthalate) based on 100 parts by weight of both components combined.

The amount of polyester present in the composition can be about 30 to about 96 wt %, more specifically about 40 to about 80 wt %, even more specifically about 50 to about 75 wt %, or yet more specifically about 60 to about 70 wt % based on the total weight of the composition.

The composition further comprises a crosslinking agent capable of crosslinking the polymer chains to produce a crosslinked polyamide or crosslinked polyester composition. Suitable crosslinking agents include those that can form free radicals under beta or gamma radiation. The crosslinking agents can contain two or more unsaturated groups including olefin groups. Suitable unsaturated groups include acryloyl, methacryloyl, vinyl, allyl, and the like. Exemplary polyallylic compounds useful as crosslinking agents include those compounds comprising two or more allylic groups, for example, triallylisocyanurate (TALC), triallylcyanurate (TAC), and the like, and combinations thereof.

As used herein, "(meth)acryloyl" is inclusive of both acryloyl and methacryloyl functionality. The crosslinking agents can include polyol poly(meth)acrylates, which are typically prepared from aliphatic diols, triols and/or tetraols containing 2-100 carbon atoms. Examples of suitable polyol poly(meth) acrylates include ethyleneglycol diacrylate, 1,6-hexanediol diacrylate, neopentylglycol di(meth)acrylate, ethyleneglycol dimethacrylate (EDMA), polyethyleneglycol di(meth)acrylates, polypropyleneglycol di(meth)acrylates, polybutyleneglycol di(meth)acrylates, 2,2-bis(4-(meth)acryloxyethoxyphenyl) propane, 2,2-bis(4-(meth)acryloxydiethoxyphenyl) propane, pentaerythritol tri(meth)acrylate, pentaerythritol tetra(meth)acrylate, dipentaerythritol penta(meth)acrylate, dipentaerythritol hexa(meth)acrylate, trimethylolpropane trimethacrylate, trimethylolpropane triacrylate (TMPTA), di(trimethylolpropane)tetra(meth)acrylate, and the like, and combinations thereof. Also included are N,N'-alkylenebisacrylamides.

The amount of crosslinking agent present in the composition may be about 0.01 to about 20 wt %, more specifically about 0.1 to about 15 wt %, even more specifically about 1 to about 10 wt %, or yet more specifically about 2 to about 7 wt % based on the total weight of the composition.

The composition further comprises a flame retardant system, wherein the flame retardant system comprises phosphinate metal salts and/or diphosphinate metal salts. Suitable phosphinate metal salts and diphosphinate metal salts include, for example a phosphinate of the formula (I), a diphosphinate of the formula (II), polymers of the foregoing, or a combination thereof:

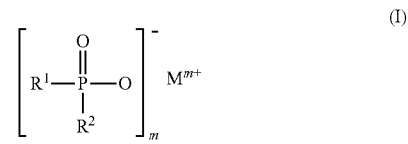

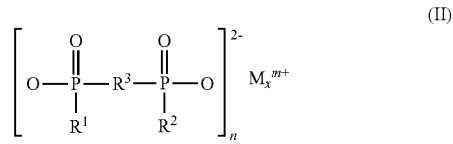

wherein $R^1$ and $R^2$ are each independently hydrogen, a linear or branched $C_1$-$C_6$ alkyl radical, or aryl radical; $R^3$ is a linear or branched $C_1$-$C_{10}$ alkylene, arylene, alkylarylene, or arylalkylene radical; M is calcium, aluminum, magnesium, strontium, barium, or zinc; m is 2 or 3; n is 1 when x is 1 and m is 2; n is 3 when x is 2 and m is 3. Exemplary salts include Exolit OP1230 by Clariant.

"Phosphinic salt" or "phosphinate" as used herein includes salts of phosphinic and diphosphinic acids and polymers thereof. Exemplary phosphinic acids as a constituent of the phosphinic salts include dimethylphosphinic acid, ethylmethylphosphinic acid, diethylphosphinic acid, methyl-n-propylphosphinic acid, methanedi(methylphosphinic acid), benzene-1,4-(dimethylphosphinic acid), methylphenylphosphinic acid and diphenylphosphinic acid. The salts of the phosphinic acids of the invention can be prepared by known methods that are described in U.S. Pat. Nos. 5,780,534 and 6,013,707 to Kleiner et al.

Exemplary phosphinate metal salts and/or diphosphinate metal salts include aluminum salt of dimethylphosphinic acid, aluminum salt of methylethylphosphinic acid, aluminum salt of methylpropylphosphinic acid, and the like.

The flame retardant system can optionally contain at least one nitrogen compound selected from the group consisting of condensation products of melamine and/or reaction products of condensation products of melamine with phosphoric acid, and/or mixtures thereof, including for example melam, melem, melon, melamine, melamine cyanurate, melamine phosphate compounds, dimelamine phosphate and/or melamine pyrophosphate, melamine polyphosphate compounds, benzoguanamine compounds, terepthalic ester com pounds of tris(hydroxyethyl)isocyanurate, allantoin compounds, glycoluril compounds, ammeline, ammelide, and combinations thereof.

Suitable nitrogen compounds include those of the formula (III) to (VIII) or combinations thereof

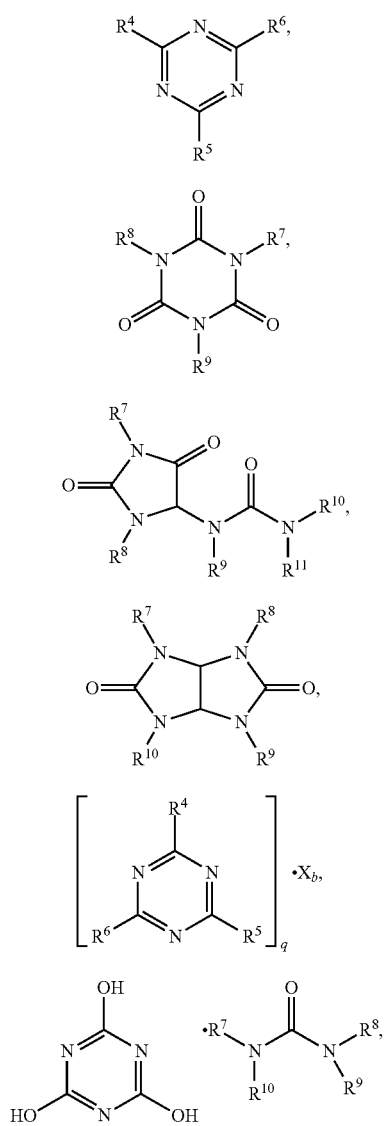

wherein $R^4$, $R^5$, and $R^6$ are independently hydrogen, hydroxy, amino, or mono- or di$C_1$-$C_8$ alkyl amino; or $C_1$-$C_8$alkyl, $C_5$-$C_{16}$cycloalkyl, -alkylcycloalkyl, wherein each may be substituted by a hydroxyl or a $C_1$-$C_4$hydroxyalkyl, $C_2$-$C_8$alkenyl, $C_1$-$C_8$alkoxy, -acyl, -acyloxy, $C_6$-$C_2$aryl, —$OR^{12}$ and $N(R^{12})R^{13}$ wherein $R^{12}$ and $R^{13}$ are each independently hydrogen, $C_1$-$C_8$alkyl, $C_5$-$C_{16}$cycloalkyl, or -alkylcycloalkyl; or are N-alicyclic or N-aromatic, where N-alicyclic denotes cyclic nitrogen containing compounds such as pyrrolidine, piperidine, imidazolidine, piperazine, and the like, and N-aromatic denotes nitrogen containing heteroaromatic ring compounds such as pyrrole, pyridine, imidazole, pyrazine, and the like; $R^7$, $R^8$, $R^9$, $R^{10}$ and $R^{11}$ are independently hydrogen, $C_1$-$C_8$alkyl, $C_5$-$C_{16}$cycloalkyl or -alkyl(cycloalkyl), each may be substituted by a hydroxyl or a $C_4$hydroxyalkyl, $C_2$-$C_8$alkenyl, $C_1$-$C_8$alkoxy, -acyl, -acyloxy, $C^6$-$C^{12}$aryl, and —O—$R^{12}$; is phosphoric acid or pyrophosphoric acid; q is 1, 2, 3, or 4; and b is 1, 2, 3, or 4.

Exemplary nitrogen compounds include allantoin, benzoguanaine, glycoluril, melamine, melamine cyanurate, melamine phosphate, melamine pyrophosphate, melamine polyphosphate, urea cyanurate, and the like.

Suitable flame retardant systems containing phosphinate metal salts and/or diphosphinate metal salts and a nitrogen compound include Exolit OP1312 available from Clariant. Other exemplary flame retardant systems are disclosed in U.S. Pat. No. 6,365,071 to Jenewein et al.

The amount of flame retardant system present in the composition may be about 3 to about 50 wt % based on the total weight of the composition, specifically about 5 to about 25, more specifically about 10 to about 20, and yet more specifically about 15 to about 18 wt %. Within these amounts, the amount of the phosphinate metal salts and/or diphosphinate metal salts present in the flame retardant system can be about 0 to about 30 wt % based on the total weight of the composition, specifically about 3 to about 25 wt %, more specifically about 5 to about 20 wt %, and yet more specifically about 8 to about 15 wt %. Correspondingly, the amount of the nitrogen compound can be about 1 to about 25 wt % based on the total weight of the composition, specifically about 3 to about 20 wt %, more specifically about 5 to about 15 wt %, and yet more specifically about 8 to about 10 wt %.

In addition to the flame retardant system, the composition further comprises a flame retardant system coagent. In one aspect, the flame retardant system co-agent is present in an amount of about 1 to about 50 wt % of the total weight of the composition, including exemplary amounts of 5, 10, 15, 20, 25, 30, 35, 40, and 45 wt %. In still further aspects, the flame retardant system co-agent can be present in a range of amounts derived from any two of the above-referenced wt % values. For example, and without limitation, in further aspects the flame retardant system co-agent can be present in an amount in the range of from 1 to 25 wt %, 5 to 20 wt %, or 1 to 15 wt %. In a further aspect, the flame retardant system co-agent comprises a mineral flame retardant, an aromatic polymer, a phosphorous flame retardant, or a combination thereof. In still further aspect, the flame retardant system co-agent can comprise a phosphorus flame retardant such as polyphosphonate or a polyphosphonate-polycarbonate copolymer, a phosphazene compound, an aryl phosphate (e.g., resorcinol diphenyl phosphate (RDP), bisphenol A diphenyl phosphate (BPADP)), or a combination thereof. In a yet further aspect, the flame retardant system can further comprise a sulphonate salt (e.g., Potassium diphenyl sulphone sulphonate (KSS)), a perfluorinated salt such as "Rimar Salt" (e.g., potassium perfluorobutane sulfonate (PFBS)), or a combination thereof.

In various aspects, the phosphorus flame retardant can be a polyphosphonate. In a further aspect, the polyphosphonate comprises residues derived from diphenyl-methyl-phosphonate (DPP). In a still further aspect, the polyphosphonate is a homopolymer comprising residues derived from DPP. The preparation of appropriate polyphosphonates is described in U.S. Pat. Nos. 7,816,486, 7,928,259, 7,888,534, 7,838,604, and 7,560,525. Exemplary polyphosphonates useful in the disclosed compositions are commercially available and marketed under the various tradenames, e.g. FRX™, including, but not limited to, FRX™ 100 (FRX Polymers, Inc., Chelmsford, Massachussetts).

In a further aspect, the mineral flame retardant is selected from a metal hydroxide, a hydroxycarbonate, a borate, an oxide mineral, or a combination thereof. In a yet further aspect, the mineral flame retardant is selected from aluminum tri-hydroxide, aluminum oxide hydroxide, magnesium di-hydroxide, or a combination including at least one of the foregoing flame retardants. In a still further aspect, the flame retardant system co-agent comprises boehmite.

In a further aspect, the flame retardant system co-agent comprises one or more aromatic compounds selected from poly(arylene ether), polyetherimide, polyetherimide/polyimide copolymers, polyarylene sulfide, polysulphone, polyethersulphone, polyetherketone, and a styrene-maleic anhydride (SMA) impact modifier.

In a further aspect, the flame retardant system co-agent comprises an polyphosphonate or copolyphosphonate. In a yet further aspect, flame retardant system co-agent comprises phosphonate oligomers, polymers, copolymers, or a combination thereof. Linear and branched phosphonate oligomers and polymers are well known in the art. Examples of branched phosphonate oligomers or polymers well known in the art include those described in U.S. Pat. Nos. 2,716,101, 3,326,852, 4,328,174, 4,331,614, 4,374,971, 4,415,719, 5,216,113, 5,334,692, 4,374,971, 3,442,854, 6,291,630, and 6,861,499. Examples of phosphonate oligomers known in the art include those described in U.S. Patent applications 20050020800, 20070219295, and 20080045673. Examples of linear phosphonate oligomers and polymers known in the art include those described in U.S. Pat. Nos. 2,534,252, 3,946, 093, 3,919,363, 6,288,210, 2,682,522, 2,891,915 and 4,046, 724.

In a further aspect, the flame retardant system co-agent comprises an phosphazene compound. Examples of such compounds are well known to the art. A phosphazene compound as described herein, is an organic compound having a —P=N— bond in the molecule. In various aspects, the phosphazene compound can include a cyclic phenoxy phosphazene, a linear phenoxy phosphazene, a phenoxy phosphazene or a combination thereof. Exemplary phosphazene compounds include phenoxyphosphazene oligomer flame retardant compound (Rabitle® FP-100 from Fushimi Pharmaceutical Co., Ltd.) represented by the formula:

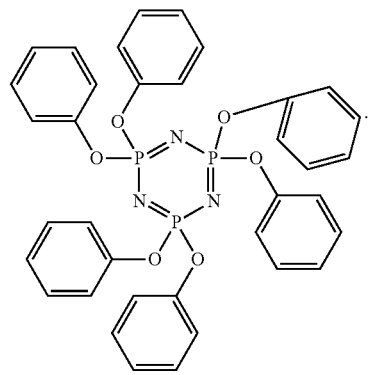 [SMILES: c1ccc(OP2(Oc3ccccc3)=NP(Oc3ccccc3)(Oc3ccccc3)=NP(Oc3ccccc3)(Oc3ccccc3)=N2)cc1]

In a further aspect, the phosphorous flame retardant can comprise an organic phosphate and/or an organic compound containing phosphorus-nitrogen bonds. In a still further aspect, the phosphorous flame retardant is an aryl phosphate having a molecular weight of from about 350 daltons to about 1000 daltons.

In a further aspect, the organic phosphate can comprise an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. In a still further aspect, the aromatic phosphates can be selected from, for example, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, p-tolyl bis(2,5,5'-trimethylhexyl)phosphate, 2-ethylhexyl diphenyl phosphate, or the like. In a specific aspect, an aromatic phosphate is one in which each G is aromatic, for example, triphenyl phosphate, tricresyl phosphate, isopropylated triphenyl phosphate, and the like.

In a further aspect, the aromatic phosphate can comprise di- or polyfunctional aromatic phosphorus-containing compounds, for example, compounds represented by the formulas:

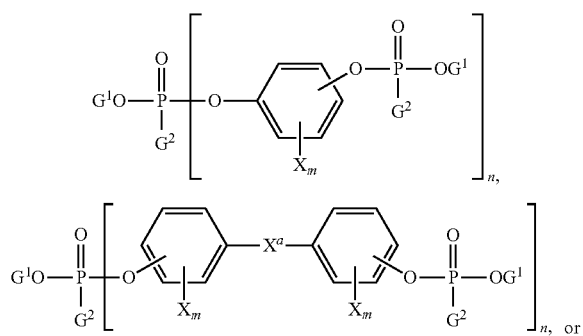

-continued

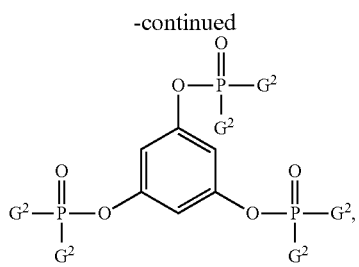

wherein each $G^1$ is independently a hydrocarbon having 1 to about 30 carbon atoms; each $G^2$ is independently a hydrocarbon or hydrocarbonoxy having 1 to about 30 carbon atoms; each $X_m$ is alkyl, aryl or hydrogen; m 0 to 4, and n is 1 to about 30. In a yet further aspect, examples of suitable di- or polyfunctional aromatic phosphorus-containing compounds include resorcinol tetraphenyl diphosphate (RDP), the bis (diphenyl)phosphate of hydroquinone and bisphenol A diphenyl phosphate (BPADP), respectively, their oligomeric and polymeric counterparts, and the like. Methods for the preparation of the aforementioned di- or polyfunctional aromatic compounds are described in British Patent No. 2,043,083.

In one aspect, the flame retardant system co-agent is present in an amount insufficient to substantially increase flammability of the composition, compared to a reference flame-retardant polymer composition in the absence of the flame retardant system coagent. In a yet further aspect, the flame retardant system co-agent is present in an amount sufficient to substantially maintain mechanical properties, compared to a reference flame-retardant polymer composition in the absence of the coagent.

Thus, in various aspects of the invention, the disclosed flame retardant polymer compositions can exhibit one or more improved performance properties when compared to a corresponding or reference composition in the absence of the flame retardant system coagent. In one aspect, the addition of the flame retardant system co-agent allows a reduction in the proportion of the flame retardant system needed to achieve desired flammability ratings. Thus, the disclosed compositions can exhibit one or more of improved mechanical properties, while exhibiting a measurable flame retardance level that is greater than or substantially equal to that of a corresponding reference composition. Further, it should be understood that these improved properties relative to the comparative reference compositions can be provided in any combination or they can occur individually for a given composition.

For purposes of these comparisons to a corresponding or reference composition, as used herein, corresponding reference composition consists essentially of the same component materials in the same component amounts as the inventive composition but for the absence of the flame retardant system coagent. To that end, in a corresponding reference composition the wt % age amount of the flame retardant system is increased to compensate for the absence of the flame retardant system coagent.

As described in the present disclosure, the use of phosphinates, alone or in combination with nitrogen compounds, can be used as a suitable alternative to halogenated flame retardants for reinforced polyamides and polyesters. However, in addition to negatively impacting flow properties, these phosphinate flame retardants can release phosphorous-containing acidic species when processed at the high temperatures used during the compounding and molding processes of such materials. It is believed that these corrosive species are generated from the acidic degradation of the phosphinates.

Without wishing to be bound by a particular theory, it is expected that the reduction of the flame retardant system can decrease the corrosivity of the inventive compositions. In one aspect, the inventive flame retardant polymer compositions can produce a reduced level of acidic species when compared to a corresponding or reference composition in the absence of the flame retardant system co-agent and reduction in the flame retardant system, produced under substantially identical compounding and molding conditions. In a further aspect, use of the inventive flame retardant polymer compositions can substantially prevent or inhibit corrosion when compared to a corresponding or reference composition in the absence of the flame retardant system co-agent and reduction in the flame retardant system, produced under substantially identical compounding and molding conditions.

The composition may optionally further comprise filler, including fibrous filler and/or low aspect ratio filler. Suitable fibrous filler may be any conventional filler used in polymeric resins and having an aspect ratio greater than 1. Such fillers may exist in the form of whiskers, needles, rods, tubes, strands, elongated platelets, lamellar platelets, ellipsoids, micro fibers, nanofibers and nanotubes, elongated fullerenes, and the like. Where such fillers exist in aggregate form, an aggregate having an aspect ratio greater than 1 will also suffice for the fibrous filler.

Suitable fibrous fillers include, for example, glass fibers, such as E, A, C, ECR, R, S, D, and NE glasses and quartz, and the like may be used as the reinforcing filler. Other suitable glass fibers include milled glass fiber, chopped glass fiber, and long glass fiber (for instance those used in a pultrusion process). Other suitable inorganic fibrous fillers include those derived from blends comprising at least one of aluminum silicates, aluminum oxides, magnesium oxides, and calcium sulfate hemihydrate. Also included among fibrous fillers are single crystal fibers or "whiskers" including silicon carbide, alumina, boron carbide, iron, nickel, or copper. Other suitable inorganic fibrous fillers include carbon fibers, stainless steel fibers, metal coated fibers, and the like.

In addition, organic reinforcing fibrous fillers may also be used including organic polymers capable of forming fibers. Illustrative examples of such organic fibrous fillers include poly(ether ketone), polyimide, polybenzoxazole, poly(phenylene sulfide), polycarbonate, aromatic polyamides including aramid, aromatic polyimides or polyetherimides, polytetrafluoroethylene, acrylic resins, and poly(vinyl alcohol). Such reinforcing fillers may be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture.

Non-limiting examples of low aspect fillers include silica powder, such as fused silica, crystalline silica, natural silica sand, and various silane-coated silicas; boron-nitride powder and boron-silicate powders; alkaline earth metal salts; alumina and magnesium oxide (or magnesia); wollastonite, including surface-treated wollastonite; calcium sulfate (as, for example, its anhydride, dihydrate or trihydrate); calcium carbonates including chalk, limestone, marble and synthetic, precipitated calcium carbonates, generally in the form of a ground particulate which often comprises 98+% $CaCO_3$ with the remainder being other inorganics such as magnesium carbonate, iron oxide and alumino-silicates; surface-treated calcium carbonates; other metal carbonates, for example magnesium carbonate, beryllium carbonate, strontium carbonate, barium carbonate, and radium carbonate; talc; glass powders; glass-ceramic powders; clay including calcined clay, for example kaolin, including hard, soft, calcined kaolin; mica; feldspar and nepheline syenite; salts or esters of orthosilicic acid and condensation products thereof; silicates including aluminosilicate, calcium silicate, and zirconium silicate; zeolites; quartz; quartzite; perlite; diatomaceous earth; silicon carbide; zinc sulfide; zinc oxide; zinc stannate; zinc hydroxystannate; zinc phosphate; zinc borate; aluminum phosphate; barium titanate; barium ferrite; barium sulfate and heavy spar; particulate aluminum, bronze, zinc, copper and nickel; carbon black, including conductive carbon black; flaked fillers such as glass flakes, flaked silicon carbide, aluminum diboride, aluminum flakes, and steel flakes; and the like. Examples of such fillers well known to the art include those described in "Plastic Additives Handbook, 4$^{th}$ Edition" R. Gachter and H. Muller (eds.), P. P. Klemchuck (assoc. ed.) Hansen Publishers, New York 1993.

The total amount of filler, fibrous or low-aspect ratio filler, present in the composition may be about 0 to about 70 wt %, more specifically about 5 to about 60 wt %, or even more specifically about 15 to about 35 wt % based on the total weight of the composition.

The composition may optionally further comprise other additives known in the art. Suitable additives include wear additives, for example, polytetrafluoroethylene (PTFE), molybdenum disulfide (MoS$_2$), graphite, aramide, carbon fibers, carbon powder, combinations comprising at least one of the foregoing wear additives, and the like. The amount of wear additive present in the composition may be about 0 to about 20 wt %, more specifically about 1 to about 15 wt %, or even more specifically about 5 to about 10 wt % based on the total weight of the composition.

The composition may optionally further comprise an aromatic polymer including, for example, poly(arylene ether), polyetherimide, polyetherimide/polyimide copolymers, poly(arylene sulfide), polysulfone, polyethersulfone, polyetheretherketone, and combinations thereof. Suitable poly(arylene ether)s include homopolymers such as those containing 2,6-dimethylphenylene ether units, copolymers including random copolymers containing, for example, such units in combination with 2,3,6-trimethyl-1,4-phenylene ether units or copolymers derived from copolymerization of 2,6-dimethylphenol with 2,3,6-trimethylphenol, and the like. Suitable poly(arylene ether)s are described in U.S. Pat. No. 6,407,200 to Singh et al. and U.S. Pat. No. 6,437,084 to Birsak et al. Suitable polyetherimides include those described in U.S. Pat. Nos. 3,847,867, 3,814,869, 3,850,885, 3,852,242, 3,855,178, and 3,983,093.

When present, the aromatic polymer can be in amounts of about 1 to about 50 wt % based on the total weight of the composition, specifically about 5 to about 25 wt %, and yet more specifically about 10 to about 15 wt %.

Other customary additives may be added to the resin compositions at the time of mixing or molding of the resin in amounts as necessary which do not have any deleterious effect on physical properties, specifically the flame retardant properties. For example, coloring agents (pigments or dyes), heat-resistant agents, oxidation inhibitors, weather-proofing agents, lubricants, mold release agents, plasticizer, and fluidity enhancing agents, and the like, may be added. Examples of pigments and dyes known to the art include those described in the chapter "Colorants" in "Plastics Additives Handbook, 4$^{th}$ Edition" R. Gachter and H. Muller (eds.), P. P. Klemchuck (assoc. ed.) Hansen Publishers, New York 1993. When used, the coloring agent may be present in an amount of up to about 5 wt % based on the total weight of the composition, more specifically about 0.001 to about 2 wt %, and yet more specifically about 0.01 to about 1 wt %.

The preparation of the compositions may be achieved by blending the ingredients under conditions for the formation of an intimate blend. Such conditions often include mixing in single or twin-screw type extruders or similar mixing devices which can apply a shear to the components.

In a further aspect, all of the ingredients may be added initially to the processing system, or else certain additives may be precompounded with one or more of the primary components. In a still further aspect, the other ingredients may include some of the polymer used to prepare the composition, while the remaining portion of the polymer is fed through a port downstream. While separate extruders may be used in the processing, these compositions can also be prepared by using a single extruder having multiple feed ports along its length to accommodate the addition of the various components. In a yet further aspect, it is often advantageous to apply a vacuum to the melt through at least one or more vent ports in the extruder to remove volatile impurities in the composition. Those of ordinary skill in the art will be able to adjust blending times and temperatures, as well as component addition, without undue additional experimentation.

In various aspects, the properties of the inventive flame-retardant polymer compositions can improve compounding and processing performance. In one aspect, the addition of the flame retardant system co-agent and reduction in the flame retardant system can improve compounding and processing performance when compared to a corresponding or reference composition in the absence of the flame retardant system coagent. In a further aspect, the d compositions can improve flow performance during compounding and injection molding. In a yet further aspect, the inventive compositions can substantially prevent or inhibit corrosion of metal parts of the compounding and processing equipment.

It should be clear that the invention encompasses reaction products of the above-described compositions, including the crosslinked products.

In one aspect, a method of forming a crosslinkable, flame retardant composition comprises blending polyamide or polyether, a crosslinking agent, a flame retardant system, and a flame retardant system co-agent to form and intimate blend wherein the flame retardant system comprises a metal phosphinate salt, a metal diphosphinate salt, or combination thereof; and optionally at least one nitrogen compound. The method can further comprise a molding step to mold the intimate blend into an article. Additionally, the molded article can be crosslinked as described below.

In another aspect, the compositions are used to prepare molded articles such as for example, durable articles, structural products, and electrical and electronic components, and the like. The compositions may be converted to articles using common thermoplastic processes such as film and sheet extrusion, injection molding, gas-assisted injection molding, extrusion molding, compression molding and blow molding. Film and sheet extrusion processes may include and are not limited to melt casting, blown film extrusion, and calendaring. Co-extrusion and lamination processes may be employed to form composite multi-layer films or sheets. Single or multiple layers of coatings may further be applied to the single or multi-layer substrates to impart additional properties such as scratch resistance, ultra violet light resistance, aesthetic appeal, and the like. Coatings may be applied through standard application techniques such as rolling, spraying, dipping, brushing, or flow-coating. Film and sheet of the invention may alternatively be prepared by casting a solution or suspension of the composition in a suitable solvent onto a substrate, belt or roll followed by removal of the solvent.

Also provided herein is a method of crosslinking the crosslinkable compositions. Specifically, the composition is formed or molded into an article and the article is exposed to an appropriate condition(s) to provide crosslinking. In one aspect, the composition is crosslinked by ionizing radiation. Exemplary ionizing radiations include beta radiation (high energy electron beam) and gamma radiation (photon emitted by a radioactive source, e.g. Cobalt 60 or Cesium 137) at any dose sufficient to effect crosslinking. The polyamide compositions can be crosslinked at irradiation doses of about 75 to about 100 kilogray (kGy). The polyester compositions can be crosslinked at irradiation doses of about 250 to about 300 kGy.

In one aspect, the crosslinked compositions prepared into 0.8 to 3.2 millimeters (mm) thick test specimens, exhibit a flammability class rating according to UL-94 of at least V2, more specifically at least V1, and yet more specifically at least V0.

In yet another aspect, the crosslinked composition exhibits a comparative tracking index (CTI) measured according to International Electrotechnical Commission (IEC) standard IEC-60112/3$^{rd}$ using a test specimen having a thickness of 4.0 mm and a diameter of a minimum of 60.0 mm of greater than about 400 Volts, specifically greater than about 500 Volts, yet more specifically greater than about 550 Volts, and still yet more specifically greater than about 600 Volts. A tracking index of 400 to 599 Volts corresponds to class 1, and 600 Volts and greater is class 0.

In another aspect, the crosslinked compositions have a Glow Wire Flammability Index (GWFI) as measured according to IEC-60695-2-1 of 960° C. at a test specimen thickness within the range of 0.8 to 3.2 millimeters thickness.

In yet another aspect, the crosslinked compositions have a Glow Wire Ignition Temperature (GWIT) as measured according to IEC-60695-2-13 of 750° C. or greater at a test specimen thickness within the range of 0.8 to 3.2 millimeters, more specifically greater than about 800° C.

In various aspects, the composition after crosslinking exhibits at least one of the following: (a) a rating of V0 according to UL 94 within the range of 0.8 to 3.2 millimeters thickness; (b) a Glow Wire Flammability Index as measured according to IEC-60695-2-1 of 960° C., or greater within the range of 0.8 to 3.2 millimeters thickness; (c) a Glow Wire Ignition Temperature as measured according to IEC-60695-2-13 of 750° C., or greater within the range of 0.8 to 3.2 millimeters thickness; or (d) a comparative tracking index measured according to International Electrotechnical Commission standard IEC-60112/3$^{rd}$ of class 1 or class 0.

In various aspects, the composition after crosslinking exhibits at least one of the following: (a) a Glow Wire Flammability Index as measured according to IEC-60695-2-1 of 960° C., or greater within the range of 0.8 to 3.2 millimeters thickness; (b) a Glow Wire Ignition Temperature as measured according to IEC-60695-2-13 of 750° C., or greater within the range of 0.8 to 3.2 millimeters thickness; or (c) a comparative tracking index measured according to International Electrotechnical Commission standard IEC-60112/3$^{rd}$ of class 1 or class 0.

In various aspects, the present invention pertains to and includes at least the following aspects.

Aspect 1: A flame retardant composition, comprising:
(a) a polyamide or polyester;
(b) a crosslinking agent,
(c) a flame retardant system comprising a metal phosphinate salt, a metal diphosphinate salt, or combination thereof; and
(d) a flame retardant system coagent;
wherein the crosslinking agent comprises two or more groups capable of forming free radicals under beta or gamma radiation.

Aspect 2: The composition of Aspect 1, wherein the metal phosphinate salt is of the formula (I) and the metal diphosphinate salt is of the formula (II)

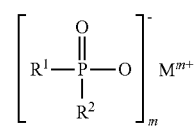

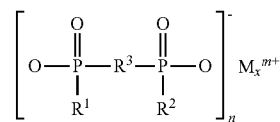

wherein $R^1$ and $R^2$ are each independently hydrogen, a linear or branched $C_1$-$C_6$ alkyl radical, or aryl radical; $R^3$ is a linear or branched $C_1$-$C_{10}$ alkylene, arylene, alkylarylene, or arylalkylene radical; M is calcium, aluminum, magnesium, strontium, barium, or zinc; m is 2 or 3; n is 1 when x is 1 and m is 2; n is 3 when x is 2 and m is 3.

Aspect 3: The composition of any of Aspects 1-2, wherein the metal salt is an aluminum salt of dimethylphosphinic acid, an aluminum salt of methylethylphosphinic acid, or an aluminum salt of methylpropylphosphinic acid.

Aspect 4: The composition of any of Aspects 1-3, wherein the flame retardant system further comprises at least one nitrogen compound selected from the group consisting of condensation products of melamine and/or reaction products of condensation products of melamine with phosphoric acid, and/or mixtures thereof, melam, melem, melon, melamine, melamine cyanurate, melamine phosphate compounds, dimelamine phosphate, melamine pyrophosphate, melamine polyphosphate compounds, benzoguanamine compounds, terephthalic ester compounds of tris(hydroxyethyl)isocyanurate, allantoin compounds, glycoluril compounds, ammeline, ammelide, and combinations thereof.

Aspect 5: The composition of any of Aspects 1-4, wherein the nitrogen compound comprises a compound of the formula (III) to (VIII) or combinations comprising at least one of the foregoing nitrogen compounds:

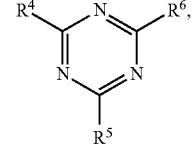

-continued

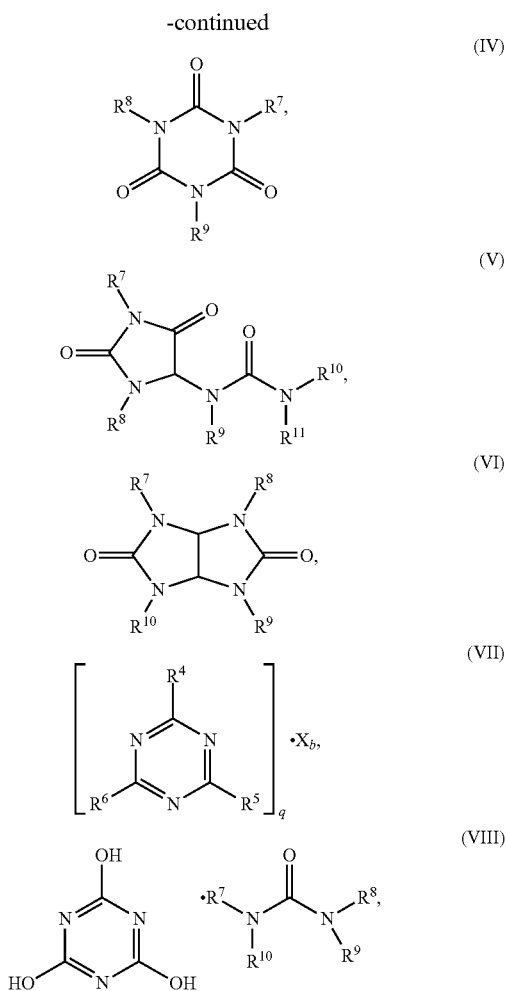

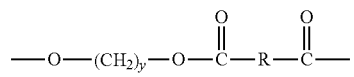

wherein $R^4$, $R^5$, and $R^6$ are independently hydrogen, hydroxy, amino, or mono- or di$C_1$-$C_8$ alkyl amino; or $C_1$-$C_8$alkyl, $C_5$-$C_{16}$cycloalkyl, -alkylcycloalkyl, wherein each may be substituted by a hydroxyl or a $C_1$-$C_4$hydroxyalkyl, $C_2$-$C_8$alkenyl, $C_1$-$C_8$alkoxy, -acyl, -acyloxy, $C_6$-$C_2$aryl, —$OR^{12}$ and $N(R^{12})R^{13}$ wherein $R^{12}$ and $R^{13}$ are each independently hydrogen, $C_1$-$C_8$alkyl, $C_5$-$C_{16}$cycloalkyl, or -alkylcycloalkyl; or are N-alicyclic or N-aromatic, where N-alicyclic denotes cyclic nitrogen containing compounds such as pyrrolidine, piperidine, imidazolidine, piperazine, and the like, and N-aromatic denotes nitrogen containing heteroaromatic ring compounds such as pyrrole, pyridine, imidazole, pyrazine, and the like; $R^7$, $R^8$, $R^9$, $R^{10}$ and $R^{11}$ are independently hydrogen, $C_1$-$C_8$alkyl, $C_5$-$C_{16}$cycloalkyl or -alkyl(cycloalkyl), each may be substituted by a hydroxyl or a $C_1$-$C_4$hydroxyalkyl, $C_2$-$C_8$alkenyl, $C_1$-$C_8$alkoxy, -acyl, -acyloxy, $C_6$-$C^{12}$aryl, and —O—$R^{12}$; X is phosphoric acid or pyrophosphoric acid; q is 1, 2, 3, or 4; and b is 1, 2, 3, or 4.

Aspect 6: The composition of any of Aspects 1-5, wherein the nitrogen compound is allantoin, benzoguanaine, glycoluril, melamine, melamine cyanurate, melamine phosphate, melamine pyrophosphate, melamine polyphosphate, or urea cyanurate.

Aspect 7: The composition of any of Aspects 1-6, wherein the polyamide is selected from the group consisting of nylon-6, nylon-6,6, nylon-4, nylon-4,6, nylon-12, nylon-6,10, nylon-6,9, nylon-6,12, nylon-9T, copolymer of nylon-6,6 and nylon-6, polyamide copolymers, polyamide blends, and combinations thereof.

Aspect 8: The composition of any of Aspects 1-7, wherein the polyamide or polyester is present in an amount of about 20 to about 96 wt % based on the total weight of the composition.

Aspect 9: The composition of any of Aspects 1-8, wherein the polyester is derived from an aliphatic diol and an aromatic dicarboxylic acid having repeating units of the following general formula:

$$-\text{O}-(\text{CH}_2)_y-\text{O}-\overset{\text{O}}{\underset{\|}{\text{C}}}-\text{R}-\overset{\text{O}}{\underset{\|}{\text{C}}}-$$

wherein y is an integer of from 2 to 6. R is a $C_6$-$C_{20}$ aryl radical comprising a decarboxylated residue derived from an aromatic dicarboxylic acid, wherein the polyester optionally comprises units derived from aliphatic acid, aliphatic polyols, or a combination thereof in an amount of about 0.5 to about 5 wt % of the total weight of the polyester.

Aspect 10: The composition of any of Aspects 1-9, wherein the polyester is poly(ethylene terephthalate), poly(1,4-butylene terephthalate), poly(ethylene naphthanoate), poly(butylene naphthanoate), poly(propylene terephthalate), or a combination thereof.

Aspect 11: The composition of any of Aspects 1-10, wherein the crosslinking agent comprises two or more unsaturated groups.

Aspect 12: The composition of any of Aspects 1-12, wherein the crosslinking agent is a polyallylic compound or a polyol poly(meth)acrylate prepared from an aliphatic diol, triol, or tetraol containing 2-100 carbon atoms.

Aspect 13: The composition of any of Aspects 1-12, further comprising up to about 60 wt % of filler.

Aspect 14: The composition of any of Aspects 1-13, wherein the filler is glass fiber, zinc borate, or a combination thereof.

Aspect 15: The composition of any of Aspects 1-14, further comprising up to about 20 wt % of a wear additive based on the total weight of the composition, wherein the wear additive is selected from the group consisting of polytetrafluoroethylene, molybdenum disulfide, graphite, aramide, carbon fiber, carbon powder, and combinations thereof.

Aspect 16: The composition of any of Aspects 1-15, wherein the composition is crosslinked with ionizing radiation to form a crosslinked composition.

Aspect 17: The composition of Aspect 16, wherein the composition after crosslinking exhibits at least one of the following:
 (a) a Glow Wire Flammability Index as measured according to IEC-60695-2-1 of 960° C., or greater within the range of 0.8 to 3.2 millimeters thickness;
 (b) a Glow Wire Ignition Temperature as measured according to IEC-60695-2-13 of 750° C., or greater within the range of 0.8 to 3.2 millimeters thickness; or
 (c) a comparative tracking index measured according to International Electrotechnical Commission standard IEC-60112/3$^{rd}$ of class 1 or class 0.

Aspect 18: The composition of any of Aspects 1-17, wherein the flame retardant system co-agent comprises boehmite.

Aspect 19: The composition of any of Aspects 1-18, wherein the flame retardant system co-agent is present in an amount of about 1 to about 50 wt % of the total weight of the composition.

Aspect 20: The composition of any of Aspects 1-19, wherein the flame retardant system co-agent comprises a mineral flame retardant, an aromatic polymer, a phosphorous flame retardant, or a combination thereof.

Aspect 21: The composition of any of Aspects 1-20, wherein the aromatic polymer is selected from polyphenyl ether, polyetherimide, polyamideimide, polyetherimide/polyimide copolymers, polyarylene sulfide, polysulphone, polyethersulphone, polyetherketone, or a combination thereof.

Aspect 22: The composition of any of Aspects 1-20, wherein the polyphenyl ether is poly(arylene ether).

Aspect 23: The composition of any of Aspects 1-20, wherein the mineral flame retardant is selected from a metal hydroxide, a hydroxycarbonate, a borate, an oxide mineral, or a combination thereof.

Aspect 24: The composition of any of Aspects 1-20, wherein the mineral flame retardant is selected from aluminum tri-hydroxide, aluminum oxide hydroxide, magnesium di-hydroxide, or a combination including at least one of the foregoing flame retardants.

Aspect 25: The composition of any of Aspects 1-20, wherein the phosphorus flame retardant is selected from a polyphosphonate, a polyphosphonate-polycarbonate copolymer, a phosphazene compound, an aryl phosphate, a sulphonate salt, or a combination thereof.

Aspect 26: The composition of any of Aspects 1-25, wherein the aryl phosphate is selected from resorcinol diphenyl phosphate, bisphenol A diphenyl phosphate, or a combination thereof.

Aspect 27: The composition of any of Aspects 1-25, wherein the phosphorus flame retardant comprises a polyphosphonate.

Aspect 28: The composition of any of Aspects 1-25, wherein the polyphosphonate comprises residues derived from diphenyl-methyl-phosphonate (DPP).

Aspect 29: The composition of any of Aspects 1-25, wherein the polyphosphonate comprises is a homopolymer comprising residues derived from diphenyl-methyl-phosphonate (DPP).

Aspect 30: The composition of any of Aspects 1-25, wherein the sulphonate salt is potassium diphenyl sulphone sulphonate, potassium perfluorobutane sulfonate, or a combination thereof.

Aspect 31: The composition of any of Aspects 1-25, wherein the phosphazene compound comprises a phenoxycyclophosphazene.

Aspect 32: The composition of any of Aspects 1-31, wherein the flame retardant composition produces a reduced level of acidic species when compared to a corresponding or reference composition in the absence of the flame retardant system co-agent and reduction in the flame retardant system, produced under substantially identical compounding and molding conditions.

Aspect 33: The composition of any of Aspects 1-31, wherein the flame retardant composition substantially prevents or inhibits corrosion when compared to a corresponding or reference composition in the absence of the flame retardant system co-agent and reduction in the flame retardant system, produced under substantially identical compounding and molding conditions.

Aspect 34: An article comprising the crosslinked composition of aspects 16.-17.

Aspect 35: A flame retardant composition, comprising:
(a) a polyamide or polyester;
(b) about 1 to about 20 wt % of a polyallylic compound or a polyol poly(meth)acrylate crosslinking agent;
(c) about 5 to about 60 wt % of glass fiber;

(d) about 5 to about 25 wt % of a flame retardant system comprising
  i. a metal phosphinate salt, a metal diphosphinate salt, or a combination thereof; and
  ii. optionally at least one nitrogen compound selected from the group consisting of condensation products of melamine and/or reaction products of condensation products of melamine with phosphoric acid, and/or mixtures thereof, melam, melem, melon, melamine cyanurate, melamine phosphate compounds, dimelamine phosphate, melamine pyrophosphate, benzoguanamine compounds, terepthalic ester compounds of tris(hydroxyethyl)isocyanurate, allantoin compounds, glycoluril compounds, ammeline, ammelide, and combinations thereof; and
(e) about 1 to 15 wt % of a flame retardant system coagent; wherein all the amounts are based upon the total weight of the composition.

Aspect 36: The composition of Aspect 35, wherein the polyamide comprises about 15 to about 35 wt % nylon-6 and about 15 to about 35 wt % nylon-6,6;
(a) about 1 to about 10 wt % of a crosslinking agent selected from the group consisting of triallylisocyanurate, triallylcyanurate, ethyleneglycol di(meth)acrylate, and trimethylolpropane tri(meth)acrylate;
(b) about 15 to about 30 wt % of glass fiber; and
(c) about 10 to about 20 wt % of the flame retardant system wherein the nitrogen compound is melamine, melamine phosphate, melamine pyrophosphate, or melamine polyphosphate;
wherein all the amounts are based upon the total weight of the composition.

Aspect 37: An article comprising the composition of any of aspects 1-36.

Aspect 38: A method of forming a crosslinkable, flame retardant composition comprising:
(a) blending a polyamide, a crosslinking agent, wherein the crosslinking agent comprises two or more groups capable of forming free radicals under beta or gamma radiation;
(b) a flame retardant system coagent, and
(c) a flame retardant system comprising
  i. a metal phosphinate salt, a metal diphosphinate salt, or combination thereof; and
  ii. optionally at least one nitrogen compound selected from the group consisting of condensation products of melamine and/or reaction products of condensation products of melamine with phosphoric acid, and/or mixtures thereof, melam, melem, melon, melamine, melamine cyanurate, melamine phosphate compounds, dimelamine phosphate, melamine pyrophosphate, melamine polyphosphate compounds, benzoguanamine compounds, terepthalic ester compounds of tris(hydroxyethyl)isocyanurate, allantoin compounds, glycoluril compounds, ammeline, ammelide, and combinations thereof, to form an intimate blend.

Aspect 39: The method of Aspect 38, further comprising molding the intimate blend into an article and crosslinking the composition with ionizing radiation.

It should be clear that compositions and articles made from the compositions made by the method of this disclosure are within the scope of the invention. All cited patents, patent applications, and other references are incorporated herein by reference in their entirety. The invention is further illustrated by the following non-limiting examples.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

As used herein below, the following are abbreviated as follows:
FM is flex modulus;
FOT is flame-out time;
FS is flex strength;
NIS is notched impact strength;
UIS is unnotched impact strength;
CM is chord modulus;
GF is glass fiber;
HDT is heat deflection temperature;
ISO refers to International Organization for Standardization, Geneva, Switzerland;
PA is polyamide;
PA6 is polyamide 6, which is also referred to in the art as nylon 6 or polycaprolactam;
PA66 is polyamide 6,6, which is also referred to in the art as nylon 6,6;
PEI is polyetherimide;
TM is tensile modulus;
TS is tensile strength; and
PPE is poly(arylene ether).

The following materials were used in the examples described herein: glass fiber was VETROTEX® 983 (Saint Gobain Vetrotex GmbH) and is indicated as "GF" in figures and tables; polyamide PA6 was Domamid® 24 (DOMO Chemicals GmbH) and is indicated as "PA6" in the figures and tables; polyamide PA66 was STABAMID® 24 AE 1 (Rhodia) and is indicated as "PA66" in the figures and tables; polyimide was Ultem® 1010 Resin (SABIC IP), an aromatic polyetherimide and is indicated as "PEI" in the figures and tables; thermal stabilizers and/or antioxidants were Irganox® 1098 (Ciba), indicated as "AO1" in the figures and tables; and Irgafos® 168 (Ciba), indicated as "AO2" in the figures and tables; release agent was aluminium stearate, indicated as "RA" in the figures and tables; flame retardant systems were Exolit® OP 1312 (Clariant), a commercial formulation of aluminium phosphinate, melamine polyphosphate and zinc borate, indicated as "FRS" in the figures and tables; boehmite was Actilox® B60 AS1 (Nabaltec), indicated as "FRS CoA" in the figures and tables, PPO—Si is polyphenylene ether-siloxane copolymer produced by SABIC IP, magnesium hydroxide is Magnifin H5 IV, from Albemarle and zinc borate is Firebrake® ZB sold by Borax.TAIC, triallylisocyanurate, is the crosslinking additive and it was supplied by Evonik as a 60% wt TAIC/PA6 masterbatch. These materials were formulated into compositions in the proportions set forth below in Tables 1, 2, 3, 4, 5, 6, 7 and 8.

The compounding was done using a vacuum-vented Coperion Werner & Pfleiderer 25 mm twin-screw extruder. The barrel temperatures ranged from 270 to 290° C.

Tensile, Impact and Flame bars were molded as per ISO standards and were conditioned at 23° C./50% humidity for 48 hrs prior to testing. After conditioning the various properties (mechanicals, thermal, rheological, flame and electrical) were measured as described in the examples. The test specimens were injection molded according to ISO 294 and tensile, flexural and impact tests were done according to ISO standard 527, 178 and 180 respectively. Flame tests were done according to UL Standard 94 using 20 mm Vertical Burning Test.

Flame properties were determined using UL94 flame testing procedure. ("Standard for Tests for Flammability of Plastic Materials for Parts in Devices and Appliances"; Underwriters Laboratories, Inc.). Tests were conducted in Atlas HVUL cabinet (HVUL 14095 and HVUL 14111; Atlas Material Testing Technology (India) Private Limited, Chemai, India) with an exhaust fan attachment to remove combustion products after each test and software controlled calibrated timing device with audio signal. All the tests were conducted in an environment of 23±2° C. and 50±5% relative humidity. The samples were pre-conditioned at 23° C./50% humidity for 48 hours prior to testing. The testing procedure was routinely carried out such that 10 flame bars were tested and the average value reported as average flame-out time (FOT) in seconds. The rating criteria according to UL94 standard are as follows: 1) V0 (vertical burn): burning stops within 10 seconds after two applications of 10 seconds each of a flame to a test bar with no flaming drips are allowed; 2) V1 (vertical burn): burning stops within 30 seconds after two applications of 10 seconds each of a flame to a test bar with no flaming drips are allowed; and, 3) V2 (vertical burn): burning stops within 30 seconds after two applications of 10 seconds each of a flame to a test bar with flaming drips are allowed. ("Standard for Tests for Flammability of Plastic Materials for Parts in Devices and Appliances"; Underwriters Laboratories, Inc.).

The Comparative Tracking Index ("CTI") is typically used in the art to measure the electrical breakdown (tracking) properties of an insulating material. Tracking is a measure of electrical breakdown on the surface of an insulating material. A large voltage difference gradually creates a conductive leakage path across the surface of the material by forming a carbonized track. The CTI testing procedure was carried as described in ASTM D3638 test method (ASTM D3638, 2007, "Standard Test Method for Comparative Tracking Index of Electrical Insulating Materials," ASTM International, West Conshohocken, Pa., 2003, DOI: 10.1520/D3638-07, www.astm.org), and utilized platinum electrodes. Briefly, the testing procedure involved adding 50 drops of a 0.1 wt % ammonium chloride solution dropwise to the surface of the material (3 mm thickness), followed by determination of the maximum voltage at which failure occurred.

Comparative examples were prepared using a commercial flame retardant formulation (FRS) in accordance with the methods described above. The comparative examples were tested to evaluate the effect of flame retardant concentration on flame retardancy properties and flow, as represented in Table 1. Reduction in the amount of FRS in the formulation appears to improve the flow of the formulation (MVR increases). However, reducing the concentration of FRS concurrently results in a gradual loss of flame retardance properties. The glow wire flame index (960° C., 1 mm) immediately fails and V0 rating in the UL94 test is lost soon thereafter. Since comparative example 2 did not pass the GWFI test (960° C., 1 mm) comparative examples 3-5 were also expected to fail and were not measured.

TABLE 1

| | Example | | | | |
|---|---|---|---|---|---|
| | C1 | C2 | C3 | C4 | C5 |
| Ingredient (% wt)* | | | | | |
| PA6 | 24.450 | 25.950 | 27.450 | 28.450 | 29.450 |
| PA66 | 22.000 | 23.500 | 25.000 | 26.000 | 27.000 |
| AO1 | 0.150 | 0.150 | 0.150 | 0.150 | 0.150 |
| AO2 | 0.150 | 0150 | 0.150 | 0.150 | 0.150 |
| RA | 0.250 | 0.250 | 0.250 | 0.250 | 0.250 |
| FRS | 23.000 | 20.000 | 17.000 | 15.000 | 13.000 |
| GF | 30.000 | 30.000 | 30.000 | 30.000 | 30.000 |
| Properties | | | | | |
| UL94, 0.8 mm | V0 | V0 | Failed | Failed | Failed |
| UL94, 1.6 mm | V0 | V0 | V0 | V1 | V2 |
| GWFI 960° C., 1 mm | Passed | Failed | | | |
| GWFI 960° C., 1.6 mm | Passed | Passed | | | |
| GWIT, 1 mm | 725 | 725 | | | |
| GWIT, 1.6 mm | 725 | 725 | | | |
| MVR, 2.16 kg, 275° C. | 13.63 | 23.75 | 26.55 | 32.59 | 33.07 |

*Amounts provided in weight %.

Representative examples were then prepared using the same commercial flame retardant system (FRS) and methods in Example C1, except that a portion of the FRS was replaced with a flame retardant system coagent. As represented in Table 2, boehmite (FRS CoA) was selected for the formulation, and representative examples were then tested to evaluate the effect boehmite (FRS CoA) as flame retardant system co-agent on flammability, mechanical properties and flow in aliphatic polyamides. As previously provided in Table 1, comparative example $C_{105}$ demonstrate that flame retardant properties are not maintained if the FRS levels are reduced. Surprisingly, the addition of boehmite (FRS CoA) to the formulations enables a reduction in FRS concentration of at least about 10% wt while maintaining the flammability rating and tracking index intact. The boehmite (FRS CoA) appears to help not only to keep the V0 rating in the UL94 flammability test, but also the glow wire flame index at 960° C. and the glow wire ignition temperature. Moreover, the boehmite also appears to contribute to maintaining other important properties for electrical & electronic applications such as the tracking index of the formulation. Additionally, the flow of the representative examples is improved over that of comparative example C1, presumably due in part to the substitution of boehmite (FRS CoA) for FRS. Normally, with the increasing addition of mineral flame retardants to thermoplastic compositions, mechanical properties can almost predictably be impaired in the form of lost impact performance or strain at break. Surprisingly, representative examples R6 and R7 indicate that doubling the amount of boehmite (FRS CoA) from about 6 to about 12% wt does not further negatively influence the mechanical properties. Further, the usage of the flame retardant combination based on boehmite/metal phosphinate appears to improve the flow of the formulation, which can permit reduced processing temperatures.

TABLE 2

| | Example | | |
|---|---|---|---|
| | C1 | R6 | R7 |
| Ingredient (% wt*) | | | |
| PA6 | 24.45 | 24.45 | 23.45 |
| PA66 | 22 | 22 | 21 |
| AO1 | 0.15 | 0.15 | 0.15 |
| AO2 | 0.15 | 0.15 | 0.15 |
| RA | 0.25 | 0.25 | 0.25 |
| FRS | 23 | 17 | 13 |
| FRS CoA | | 6 | 12 |
| GF | 30 | 30 | 30 |
| Properties | | | |
| GWFI 960° C./1.6 mm | Passed | Passed | Passed |
| GWFI 960° C./1 mm | Passed | Passed | Passed |
| GWIT 1.6 mm | 725 | 725 | 725 |
| GWIT 1 mm | 725 | 725 | 725 |
| UL94, 0.8 mm | V0 | V0 | V0 |
| UL94, 1.6 mm | V0 | V0 | V0 |
| FM (GPa) | 9404.8 | 9232.8 | 9402 |
| FS (MPa) | 196.13 | 171.15 | 174.65 |
| Strain at Break (%) | 2.78 | 2.37 | 2.38 |
| NIS (kJ/m$^2$) | 7.83 | 6.04 | 6.04 |
| UIS (kJ/m$^2$) | 51.34 | 37.62 | 38.42 |
| CM (Gpa) | 11279.8 | 10981.6 | 11759.6 |
| Stress at Break (Mpa) | 135.69 | 119.72 | 123.44 |
| Strain at Break (%) | 2.3 | 1.84 | 1.84 |
| CTI (V) | 600 V | 600 V | 600 V |
| MVR, 2.16 kg, 275° C. | 13.63 | 22.95 | 23.96 |

*Amounts provided in weight %.

Table 3 provides the data from glass fiber reinforced polyamide compositions containing a flame retardant system (FRS) comprising a metal phosphinate salt and a nitrogen compound. The following examples were tested to determine the effect of polyetherimide (PEI) as a flame retardant system co-agent on flammability and mechanical properties. When using PEI as a flame retardant system coagent, flammability properties where substantially maintained, while mechanical properties were slightly improved or substantially equal.

TABLE 3

| | Examples | | |
|---|---|---|---|
| | 8 | 9 | 10 |
| Ingredient (% wt) | | | |
| PA6 | 26 | 25.5 | 20.5 |
| PA66 | 26 | 21.5 | 21.5 |
| PA6, MILLED | 2.45 | 2.45 | 2.45 |
| AO1 | 0.15 | 0.15 | 0.15 |
| AO2 | 0.15 | 0.15 | 0.15 |
| RA | 0.25 | 0.25 | 0.25 |
| FRS | 15 | 15 | 15 |
| PEI | | 5 | 10 |
| GF | 30 | 30 | 30 |
| Properties | | | |
| UL94, 1.6 mm | V1 | V1 | V1 |
| UL94, 0.8 mm | Failed | V1 | V0 |
| GWFI 960° C./1.6 mm | | Passed | Passed |
| GWFI 960° C./1 mm | Failed | Failed | Passed |
| GWIT 1.6 mm | | 725 | 750 |
| GWIT, 1 mm | | 725 | 725 |
| CTI | | 575 | 425 |
| Flexural Modulus | 8.0 | 8.8 | 9.1 |
| Flexural Strength | 196.64 | 226 | 217 |
| Strain at Break | 3.36 | 3.2 | 3.3 |
| Impact notched | 10 | 9.4 | 9.0 |
| Impact unnotched | 57 | 62 | 61 |
| Chord Modulus | 9.6 | 11.3 | 11.3 |
| Stress at Break | 135 | 150 | 146 |
| Strain at Break | 3.1 | 3.1 | 3.0 |

*Amounts provided in weight %.

Table 4 provides the data from glass fiber reinforced polyamide formulations containing a flame retardant system comprising a metal phosphinate salt and a nitrogen compound. The following examples were tested to determine the effect boehmite and MgOH as flame retardant system coagents on flammability and mechanical properties. Surprisingly, boehmite appears to exhibit superior flame retardancy than MgOH when used in combination with a flame retardant system comprising a metal phosphinate salt and a nitrogen compound.

TABLE 4

| | Examples | | |
|---|---|---|---|
| | 11 | 12 | 13 |
| Ingredient (% wt) | | | |
| PA6 | 26 | 38 | 38 |
| PA66 | 26 | | |
| PA6, MILLED | 2.45 | 2.45 | 2.45 |
| AO1 | 0.15 | 0.15 | 0.15 |
| AO2 | 0.15 | 0.15 | 0.15 |
| RA | 0.25 | 0.25 | 0.25 |
| GF | 30 | 30 | 30 |
| FRS CoA | | | 10.0 |
| FRS | 23 | 14.0 | 14.0 |
| Zinc Borate | | 5.0 | 5.0 |
| Magnesium Hydroxide | | 10.0 | |
| Properties | | | |
| UL94, 0.8 mm | V0 | V2 | V0 |
| UL94, 1.6 mm | V0 | NR | V0 |
| GWFT 960° C./1 mm | Passed | Failed | Passed |
| GWFT 960° C./1.6 mm | Passed | Failed | Passed |
| GWIT, 1 mm (° C.) | 725 | 750 | 725 |
| GWIT, 1.6 mm (° C.) | 725 | 775 | 750 |
| FM (GPa) | 10.3 | 8.4 | 10.3 |
| FS (MPa) | 220.52 | 159.72 | 176.85 |
| Strain at Break (%) | 3.33 | 2.53 | 2.37 |
| NIS (kJ/m²) | 9.4 | 5.13 | 5.96 |
| UIS (kJ/m²) | 54 | 32.61 | 36.6 |
| CM (Gpa) | 11.9 | 10.5 | 12.6 |
| Stress at Break (Mpa) | 140.22 | 113.48 | 118.53 |
| Strain at Break (%) | 3.04 | 2.08 | 2.0 |
| CTI (V) | 600 | 425 | 600 |

Tables 5-6 provide data from glass fiber reinforced crosslinkable and crosslinked polyamide formulations containing a flame retardant system comprising a metal phosphinate salt and a nitrogen compound. A crosslinking additive and a flame retardant co-agent were added to these formulations. Cross-linking was carried out via irradiation of the molded parts, i.e. samples were exposed to a dose of 100 kilograys via beta irradiation. Formulations were tested before and after being irradiated and surprisingly it was found out that GWFT test is passed after irradiation, GWIT is improved after irradiation and that CTI improves after irradiation. Results can be found in tables 5-6.

TABLE 5

| | Examples | | | |
|---|---|---|---|---|
| | 14 | | 15 | |
| Ingredient (% wt) | | | | |
| PA6 | 19.15 | | 18 | |
| AO1 | 0.15 | | 0.05 | |
| AO2 | 0.15 | | 0.05 | |
| RA | 0.25 | | 0.25 | |
| PA66 | 19 | | 18.35 | |
| FRS | 23 | | 15 | |
| PPO-Si | | | 10 | |
| PEI | | | | |
| FRS CoA | | | | |
| TAIC MB | 8.3 | | 8.3 | |
| GF | 30 | | 30 | |

| Properties | Pre-Irrad* | Post-Irrad* | Pre-Irrad* | Post-Irrad* |
|---|---|---|---|---|
| FM (GPa) | 9.0 | 10.2 | 8.2 | 8.6 |
| FS (MPa) | 157 | 183 | 172 | 185 |
| Strain at Break (%) | 2.5 | 2.2 | 2.7 | 2.6 |
| UIS (kJ/m2) | 29.5 | 29.8 | 39.3 | 37.3 |
| NIS (kJ/m2) | 6.5 | 6.8 | 7.3 | 7.6 |
| CM (Gpa) | 10.6 | 11.9 | 10.6 | 11.0 |
| Stress at Break (Mpa) | 107 | 125 | 128 | 139 |
| Strain at Break (%) | 2.1 | 2.1 | 2.3 | 2.3 |
| GWFT 960° C./1.6 mm | passes | passes | | passes |
| GWFT 960° C./0.8 mm | passes | passes | | passes |
| GWIT, 1.6 mm (° C.) | 725 | 825 | 750 | 825 |
| GWIT, 0.8 mm (° C.) | 725 | 800 | | |
| CTI (V) | 600 | 600 | 450 | 600 |

*"Pre-irrad" shows the indicated property prior to beta irradiation of the sample; "Post-Irrad" shows indicated property following beta irradiation of the sample at 100 KGy.

TABLE 6

| | Examples | |
|---|---|---|
| | 16 | 17 |
| Ingredient (% wt) | | |
| PA6 | 18 | 18 |
| AO1 | 0.05 | 0.05 |
| AO2 | 0.05 | 0.05 |
| RA | 0.25 | 0.25 |

TABLE 6-continued

| | Examples | |
| --- | --- | --- |
| | 16 | 17 |
| PA66 | 18.35 | 18.35 |
| FRS | 15 | 15 |
| PPO-Si | | |
| PEI | | 10 |
| FRS CoA | 10 | |
| TAIC MB | 8.3 | 8.3 |
| GF | 30 | 30 |

| Properties | Pre-Irrad* | Post-Irrad* | Pre-Irrad* | Post-Irrad* |
| --- | --- | --- | --- | --- |
| FM (GPa) | 7.8 | 9.2 | 8.4 | 9.0 |
| FS (MPa) | 140 | 158 | 178 | 189 |
| Strain at Break (%) | 2.5 | 2.0 | 2.9 | 2.6 |
| UIS (kJ/m2) | 30.3 | 30.4 | 46.1 | 36.7 |
| NIS (kJ/m2) | 5.2 | 4.9 | 8.0 | 7.7 |
| CM (Gpa) | 10.2 | 11.5 | 10.7 | 11.2 |
| Stress at Break (Mpa) | 101 | 114 | 136 | 142 |
| Strain at Break (%) | 1.9 | 1.8 | 2.6 | 2.3 |
| GWFT 960° C./1.6 mm | | passes | | passes |
| GWFT 960° C./0.8 mm | | passes | | passes |
| GWIT, 1.6 mm (° C.) | 750 | 850 | 775 | 850 |
| GWIT, 0.8 mm (° C.) | | | | |
| CTI (V) | 600 | 600 | 450 | 600 |

*"Pre-irrad" shows the indicated property prior to beta irradiation of the sample; "Post-Irrad" shows indicated property following beta irradiation of the sample at 100 KGy.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A flame retardant composition, comprising:
(a) a polyamide or polyester;
(b) a crosslinking agent,
(c) a flame retardant system comprising a metal phosphinate salt, a metal diphosphinate salt, or combination thereof; and
(d) a flame retardant system coagent,
wherein the flame retardant system and the flame retardant system coagent being different from one another;
wherein the crosslinking agent comprises two or more groups capable of forming free radicals under beta or gamma radiation; and further wherein the flame retardant system coagent is present in an amount of about 1 to about 50 wt % of the total weight of the composition and comprises a mineral flame retardant, a phosphorous flame retardant, boehmite, or a combination thereof.

2. The composition of claim 1, wherein the metal phosphinate salt is of the formula (I) and the metal diphosphinate salt is of the formula (II)

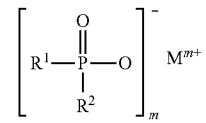

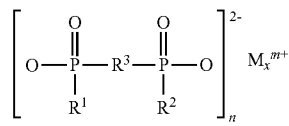

wherein $R^1$ and $R^2$ are each independently hydrogen, a linear or branched $C_1$-$C_6$ alkyl radical, or aryl radical; $R^3$ is a linear or branched $C_1$-$C_{10}$ alkylene, arylene, alkylarylene, or arylalkylene radical; M is calcium, aluminum, magnesium, strontium, barium, or zinc; m is 2 or 3; n is 1 when x is 1 and m is 2; n is 3 when x is 2 and m is 3.

3. The composition of claim 1, wherein the metal salt is an aluminum salt of dimethylphosphinic acid, an aluminum salt of methylethylphosphinic acid, or an aluminum salt of methylpropylphosphinic acid.

4. The composition of claim 1, wherein the flame retardant system further comprises at least one nitrogen compound selected from the group consisting of condensation products of melamine and/or reaction products of condensation products of melamine with phosphoric acid, and/or mixtures thereof, melam, melem, melon, melamine, melamine cyanurate, melamine phosphate compounds, dimelamine phosphate, melamine pyrophosphate, melamine polyphosphate compounds, benzoguanamine compounds, terephthalic ester compounds of tris(hydroxyethyl) isocyanurate, allantoin compounds, glycoluril compounds, ammeline, ammelide, and combinations thereof.

5. The composition of claim 4, wherein the nitrogen compound comprises a compound of the formula (III) to (VIII) or combinations comprising at least one of the foregoing nitrogen compounds

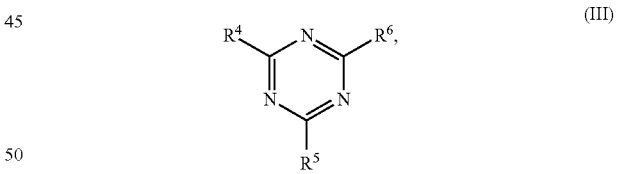

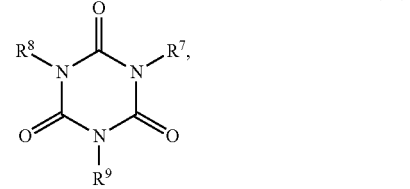

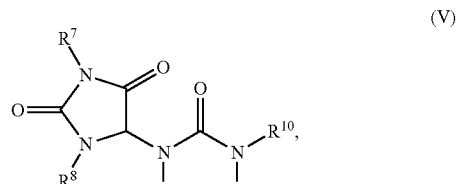

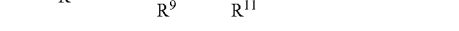

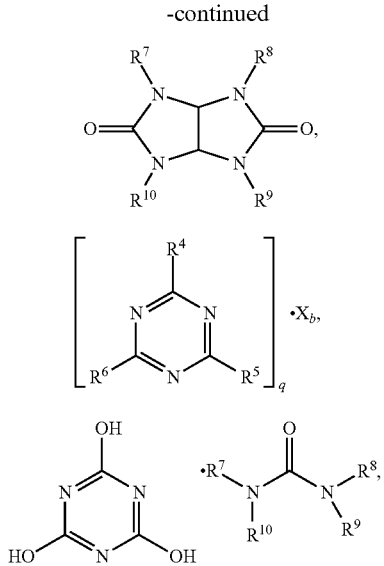

wherein R4, R5, and R6 are independently hydrogen, hydroxy, amino, or mono- or diC1-C8 alkyl amino; or C1-C8alkyl, C5-C16cycloalkyl, -alkylcycloalkyl, wherein each may be substituted by a hydroxyl or a C 1-C4hydroxyalkyl, C2-C8alkenyl, C1-C8alkoxy, -acyl, -acyloxy, C6-C2aryl, —OR12 and N(R12)R13 wherein R12 and R13 are each independently hydrogen, C1-C8alkyl, C5-Cl6cycloalkyl, or -alkylcycloalkyl; or are N-alicyclic or N-aromatic, where N-alicyclic denotes cyclic nitrogen containing compounds such as pyrrolidine, piperidine, imidazolidine, piperazine, and the like, and N-aromatic denotes nitrogen containing heteroaromatic ring compounds such as pyrrole, pyridine, imidazole, pyrazine, and the like; R7, R8, R9, R16 and R11 are independently hydrogen, C1-C8alkyl, C5-C16cycloalkyl or -alkyl(cycloalkyl), each may be substituted by a hydroxyl or a C1-C4hydroxyalkyl, C2-C8alkenyl, C1-C8alkoxy, -acyl, -acyloxy, C6-Cl2aryl, and —O—R12; X is phosphoric acid or pyrophosphoric acid; q is 1, 2, 3, or 4; and b is 1, 2, 3, or 4.

6. The composition of claim 4, wherein the nitrogen compound is allantoin, benzoguanaine, glycoluril, melamine, melamine cyanurate, melamine phosphate, melamine pyrophosphate, melamine polyphosphate, or urea cyanurate.

7. The composition of claim 1, wherein the polyamide is selected from the group consisting of nylon-6, nylon-6,6, nylon-4, nylon-4,6, nylon-12, nylon-6,10, nylon-6,9, nylon-6,12, nylon-9T, copolymer of nylon-6,6 and nylon-6, polyamide copolymers, polyamide blends, and combinations thereof.

8. The composition of claim 1, wherein the polyamide or polyester is present in an amount of about 20 to about 96 wt % based on the total weight of the composition.

9. The composition of claim 1, wherein the polyester is derived from an aliphatic diol and an aromatic dicarboxylic acid having repeating units of the following general formula:

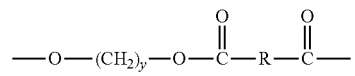

wherein y is an integer of from 2 to 6. R is a C6-C20 aryl radical comprising a decarboxylated residue derived from an aromatic dicarboxylic acid, wherein the polyester optionally comprises units derived from aliphatic acid, aliphatic polyols, or a combination thereof in an amount of about 0.5 to about 5 wt % of the total weight of the composition.

10. The composition of claim 1, wherein the polyester is poly(ethylene terephthalate), poly(1, 4-butylene terephthalate), poly(ethylene naphthanoate), poly(butylene naphthanoate), poly(propylene terephthalate), or a combination thereof.

11. The composition of claim 1, wherein the crosslinking agent comprises two or more unsaturated groups.

12. The composition of claim 1, wherein the crosslinking agent is a polyallylic compound or a polyol poly(meth)acrylate prepared from an aliphatic diol, triol, or tetraol containing 2-100 carbon atoms.

13. The composition of claim 1, further comprising up to about 60 wt % of filler of the total weight of the composition.

14. The composition of claim 1, wherein the filler is glass fiber, zinc borate, or a combination thereof.

15. The composition of claim 1, further comprising up to about 20 wt % of a wear additive based on the total weight of the composition, wherein the wear additive is selected from the group consisting of polytetrafluoroethylene, molybdenum disulfide, graphite, aramide, carbon fiber, carbon powder, and combinations thereof.

16. The composition of claim 1, wherein the composition is crosslinked with ionizing radiation to form a crosslinked composition.

17. The composition of claim 1, wherein the composition after crosslinking exhibits at least one of the following:
(a) a Glow Wire Flammability Index as measured according to IEC-60695-2-1 of 960° C., or greater within the range of 0.8 to 3.2 millimeters thickness;
(b) a Glow Wire Ignition Temperature as measured according to IEC-60695-2-13 of 750° C., or greater within the range of 0.8 to 3.2 millimeters thickness; or
(c) a comparative tracking index measured according to International Electrotechnical Commission standard IEC-60112/3rd of class 1 or class 0.

18. The composition of claim 1, wherein the flame retardant system coagent is boehmite.

19. The composition of claim 1, wherein the mineral flame retardant is selected from a metal hydroxide, a hydroxycarbonate, a borate, an oxide mineral, or a combination thereof.

20. The composition of claim 1, wherein the mineral flame retardant is selected from aluminum tri-hydroxide, aluminum oxide hydroxide, magnesium di-hydroxide, or a combination including at least one of the foregoing flame retardants.

21. The composition of claim 1, wherein the phosphorus flame retardant is selected from a polyphosphonate, a polyphosphonate-polycarbonate copolymer, a phosphazene compound, an aryl phosphate, a sulphonate salt, or a combination thereof.

22. The composition of claim 21, wherein the aryl phosphate is selected from resorcinol diphenyl phosphate, bisphenol A diphenyl phosphate, or a combination thereof.

23. The composition of claim 21, wherein the phosphorus flame retardant comprises a polyphosphonate.

24. The composition of claim 23, wherein the polyphosphonate comprises residues derived from diphenyl-methyl-phosphonate.

25. The composition of claim 24, wherein the polyphosphonate comprises is a homopolymer comprising residues derived from diphenyl-methyl-phosphonate.

26. The composition of claim 21, wherein the sulphonate salt is potassium diphenyl sulphone sulphonate, potassium perfluorobutane sulfonate, or a combination thereof.

27. The composition of claim 21, wherein the phosphazene compound comprises a phenoxycyclophosphazene.

28. The composition of claim 1, wherein the flame retardant composition produces a reduced level of acidic species when compared to a corresponding or reference composition in the absence of the flame retardant system coagent and reduction in the flame retardant system, produced under substantially identical compounding and molding conditions.

29. The composition of claim 1, wherein the flame retardant composition substantially prevents or inhibits corrosion when compared to a corresponding or reference composition in the absence of the flame retardant system co-agent and reduction in the flame retardant system, produced under substantially identical compounding and molding conditions.

30. An article comprising the crosslinked composition of claim 16.

31. A flame retardant composition, comprising:
   (a) a polyamide or polyester;
   (b) about 1 to about 20 wt % of a polyallylic compound or a polyol poly(meth)acrylate crosslinking agent;
   (c) about 5 to about 60 wt % of glass fiber;
   (d) about 5 to about 25 wt % of a flame retardant system comprising
      i. a metal phosphinate salt, a metal diphosphinate salt, or a combination thereof; and
      ii. optionally at least one nitrogen compound selected from the group consisting of condensation products of melamine and/or reaction products of condensation products of melamine with phosphoric acid, and/or mixtures thereof, melam, melem, melon, melamine cyanurate, melamine phosphate compounds, dimelamine phosphate, melamine pyrophosphate, benzoguanamine compounds, terepthalic ester compounds of tris(hydroxyethyl)isocyanurate, allantoin compounds, glycoluril compounds, ammeline, ammelide, and combinations thereof; and
   (e) about 1 to 15 wt % of a flame retardant system coagent;
wherein all the amounts are based upon the total weight of the composition.

32. The composition of claim 31, wherein the polyamide comprises about 15 to about 35 wt % nylon-6 and about 15 to about 35 wt % nylon-6,6;
   (f) about 1 to about 10 wt % of a crosslinking agent selected from the group consisting of triallylisocyanurate, triallylcyanurate, ethyleneglycol di(meth)acrylate, and trimethylolpropane tri(meth)acrylate;
   (g) about 15 to about 30 wt % of glass fiber; and
   (h) about 10 to about 20 wt % of the flame retardant system wherein the nitrogen compound is melamine, melamine phosphate, melamine pyrophosphate, or melamine polyphosphate;
wherein all the amounts are based upon the total weight of the composition.

33. A method of forming a crosslinkable, flame retardant composition comprising:
   (i) blending a polyamide, a crosslinking agent, wherein the crosslinking agent comprises two or more groups capable of forming free radicals under beta or gamma radiation;
   (j) a flame retardant system coagent, and
   (k) a flame retardant system comprising
      i. a metal phosphinate salt, a metal diphosphinate salt, or combination thereof; and
      ii. optionally at least one nitrogen compound selected from the group consisting of condensation products of melamine and/or reaction products of condensation products of melamine with phosphoric acid, and/or mixtures thereof, melam, melem, melon, melamine, melamine cyanurate, melamine phosphate compounds, dimelamine phosphate, melamine pyrophosphate, melamine polyphosphate compounds, benzoguanamine compounds, terepthalic ester compounds of tris(hydroxyethyl)isocyanurate, allantoin compounds, glycoluril compounds, ammeline, ammelide, and combinations thereof, to form an intimate blend.

34. The method of claim 33, further comprising molding the intimate blend into an article and crosslinking the composition with ionizing radiation.

* * * * *